US007063391B2

(12) United States Patent
Peng

(10) Patent No.: US 7,063,391 B2
(45) Date of Patent: Jun. 20, 2006

(54) LUMINESCENCE WHEEL AXLE ASSEMBLY

(76) Inventor: Chi-Tsung Peng, 23,R&D Road2, Science-Based Industrial Park, Hsin-Chu City (TW)

( * ) Notice: Subject to any disclaimer, the term of this patent is extended or adjusted under 35 U.S.C. 154(b) by 37 days.

(21) Appl. No.: 10/723,559

(22) Filed: Nov. 26, 2003

(65) Prior Publication Data

US 2005/0110332 A1 May 26, 2005

(51) Int. Cl.
*B60B 7/06* (2006.01)
*B60Q 1/56* (2006.01)

(52) U.S. Cl. .............................. 301/37.41; 301/37.108; 362/500

(58) Field of Classification Search ................ 301/104, 301/37.41, 37.108; 362/500, 555; 40/541, 40/546, 547, 549, 553, 556
See application file for complete search history.

(56) References Cited

U.S. PATENT DOCUMENTS

| 5,121,305 | A  | * | 6/1992  | Deed et al. ............... | 362/473 |
| 5,800,039 | A  | * | 9/1998  | Lee ........................... | 362/473 |
| 6,492,963 | B1 | * | 12/2002 | Hoch ........................ | 345/39  |
| 6,501,199 | B1 | * | 12/2002 | Hung ........................ | 310/67 A |
| 6,530,683 | B1 | * | 3/2003  | Ohkohdo et al. .......... | 362/511 |
| 6,822,357 | B1 | * | 11/2004 | Hung ........................ | 310/75 C |

\* cited by examiner

*Primary Examiner*—Jason R. Bellinger
(74) *Attorney, Agent, or Firm*—Birch, Stewart, Kolasch & Birch, LLP

(57) ABSTRACT

An improved luminescence wheel assembly has a latch base coupled to a plastic optical fiber structure installed on both sides of a wheel axle, such that the improved luminescence wheel assembly is easy to install, easy to remove, and aesthetically pleasing. The improved luminescence wheel assembly is capable of adjusting the size of its structure according to the size of the wheel axle.

7 Claims, 5 Drawing Sheets

LUMINESCENCE WHEEL AXLE ASSEMBLY

BACKGROUND OF THE INVENTION

1. Field of the Invention

The present invention relates to an improved luminescence wheel axle assembly, more particularly a wheel axle having an improved luminescence assembly mounted on the wheel to accomplish the effects for the overall luminescence of the wheel and safe driving at night.

2. Description of the Prior Art

In general, a regular wheel does not come with a warning device. At present, the market has some wheels with reflective warning devices installed on the spoke cable, and such reflective warning device is the traditional warning device that makes use of the light reflection to accomplish an effect for safe night driving. Some wheels have warning devices installed between both sides of the axle of the wheel to accomplish such safety effect, but their installation and removal are not simple and easy, and thus have the shortcomings of complexity and inconvenience.

SUMMARY OF THE INVENTION

The primary objective of the present invention is to provide an improved luminescence wheel assembly comprising a latch base coupled to a plastic optical fiber structure installed on both sides of the wheel axle, such that the product is easy to install, easy to remove, and aesthetically pleasing. The present invention can also accomplish the purpose of driving safely at night.

The secondary objective of the present invention is to provide an improved luminescence wheel assembly capable of adjusting the size of its structure according to the size of the wheel axle, which can fit different sizes of wheel axles.

BRIEF DESCRIPTION OF THE DRAWINGS

The other objects and features of the present invention can be more fully understood by referring to the following description of preferred embodiments and accompanying drawing in which:

FIG. 3-1 is an illustrative diagram of the latch base coupled with the ratchet bolt structure according to the present invention.

FIG. 3-2 is an illustrative diagram of the latch base being separated from the ratchet bolt according to the present invention.

DETAILED DESCRIPTION OF THE PREFERRED EMBODIMENT

Figure 1:
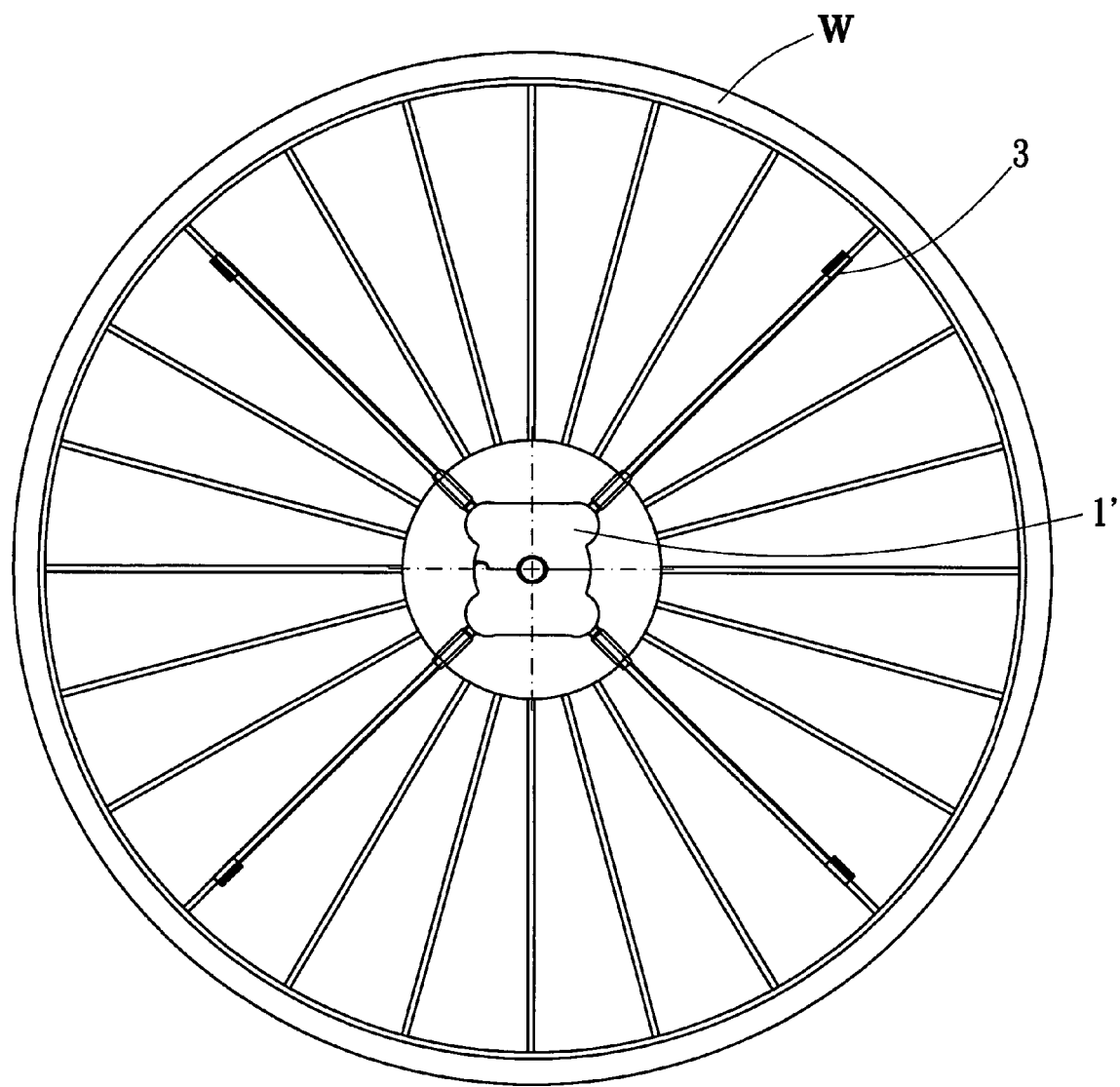
FIG. 1 is an illustrative diagram of a preferred embodiment of the present invention.

Please refer to FIGS. 1 to 5 for the luminescence wheel axle assembly in accordance with this invention, comprising a latch base 1', a ratchet bolt structure 5, and a plastic optical fiber structure 3; wherein the latch base 1' has a circular hole 41 at its center for facilitating its being mounted on to an axle 4 of a wheel W, and the latch base 1' comprises an upper latch base 1 and a lower latch base 2, and the upper latch base 1 comprises an upper casing 11, a lower casing 12, a plurality of screw holes 111 disposed on the upper casing 11, a receiving rotary axle 5' disposed at the left lower end surface of the lower casing 12, a ratchet bolt structure 5 disposed on the right end surface, and the lower latch base comprising an upper casing 21, a lower casing 22, a plurality of screw holes 211 disposed on the upper casing 21, a rotary axle 5' disposed on the upper left end surface of the upper casing 21, and a ratchet 221 on the right end surface of the upper casing 21. The rotary axle 5' has a rotary end surface 51' for the support and is inserted into the receiving rotary axle 5" for pivotally coupling the upper latch base 1 and the lower latch base 2, and further comprises a plurality of insert holes on the lateral end surface of the latch base 1' for receiving the insertion of the plastic optical fiber structure.

Figure 2:
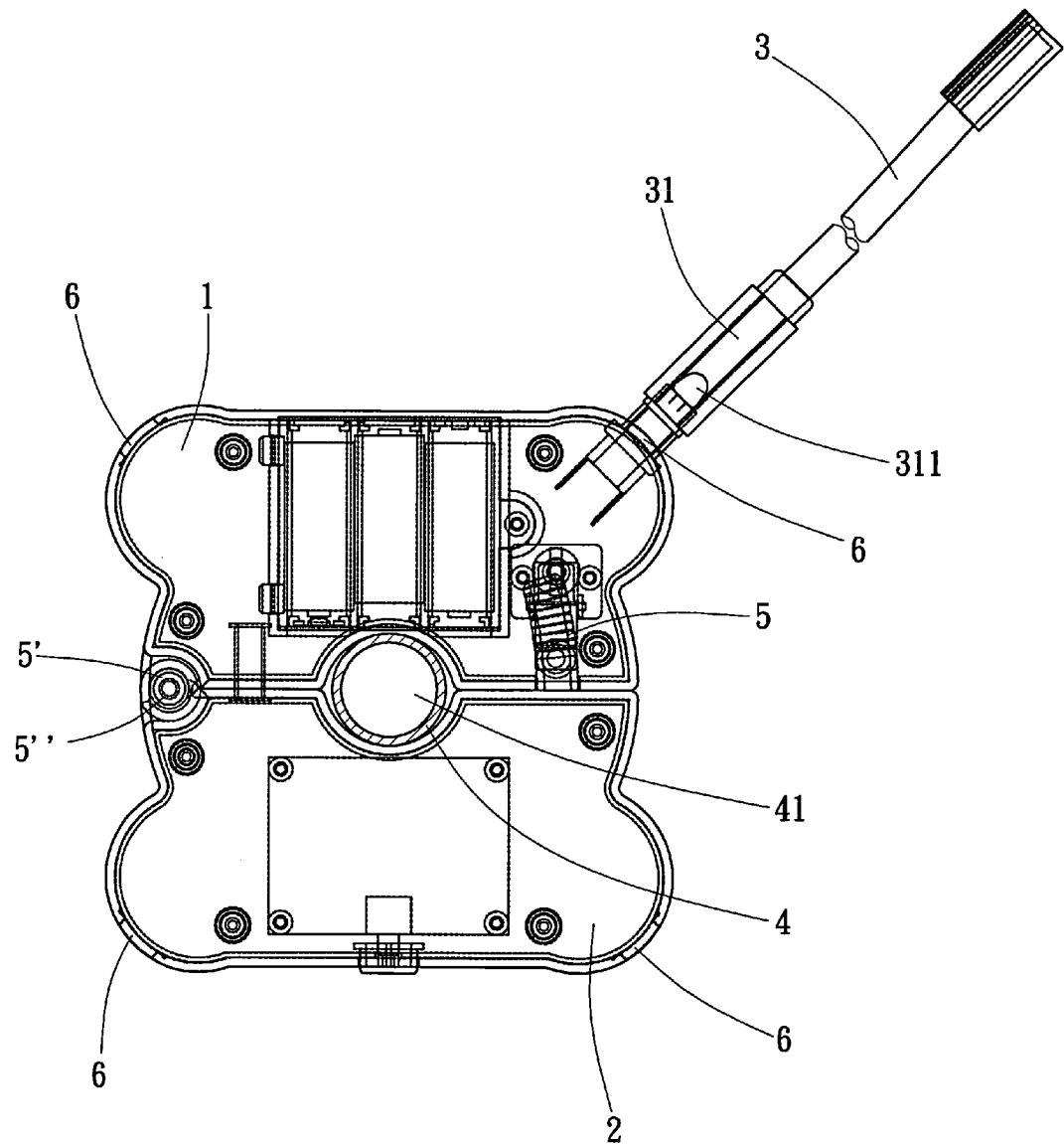
FIG. 2 is a cross-sectional diagram of the latch base and the plastic optical fiber structure of the present invention.
Figures 1, 2, 3:
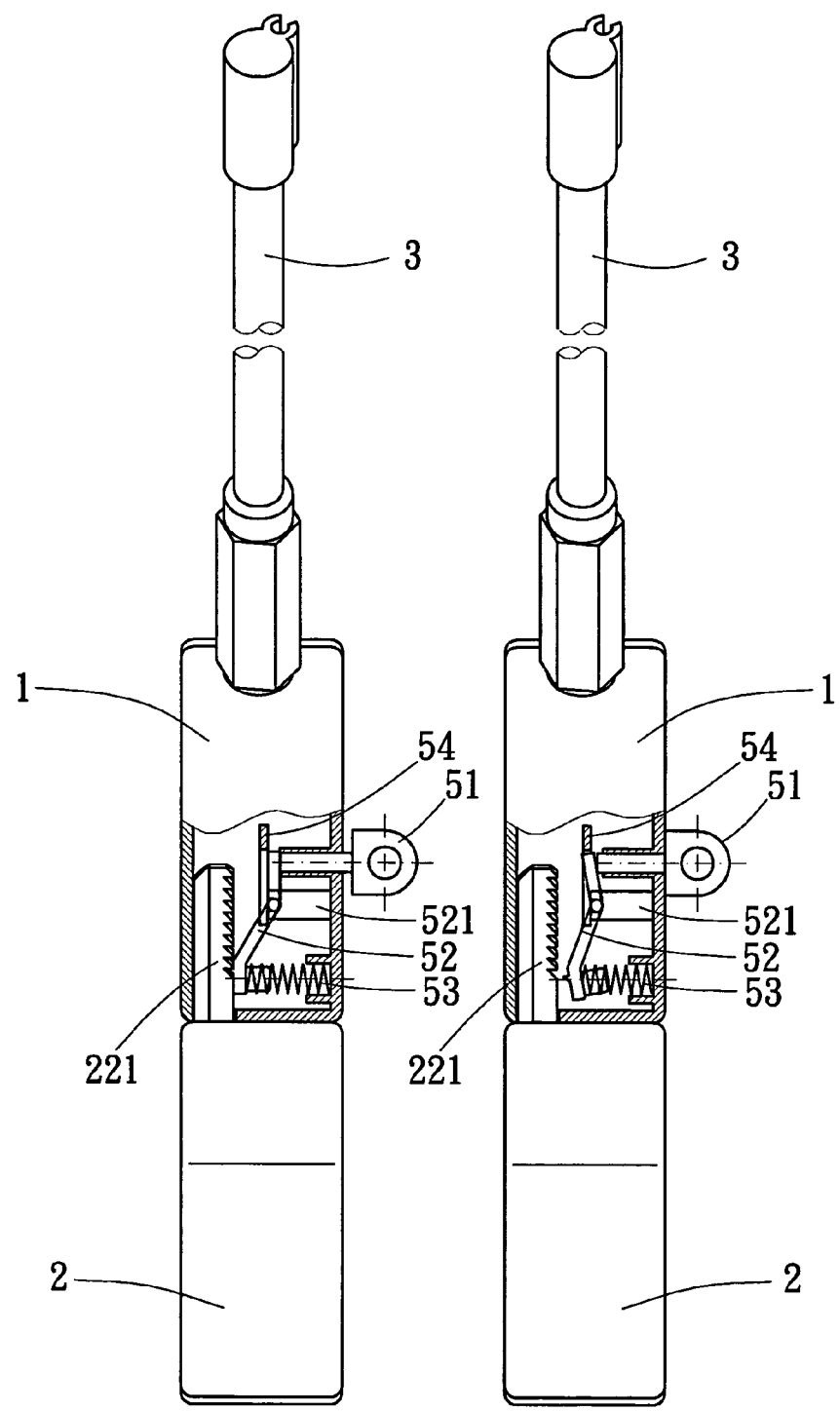
Figure 4:
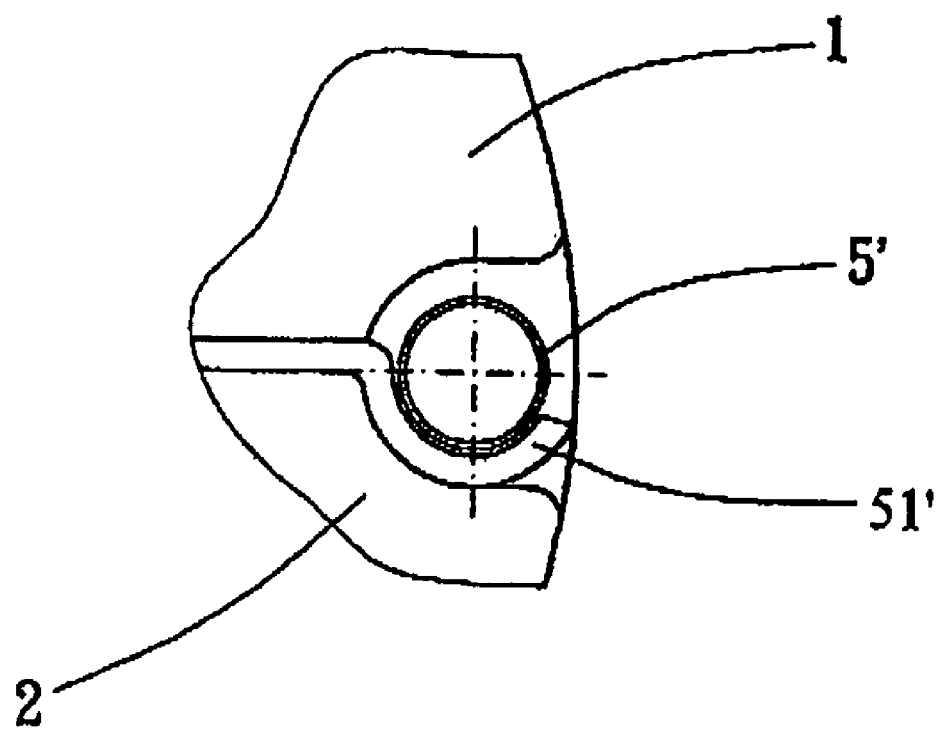
FIG. 4 is an illustrative diagram of the rotary axle of the present invention.
Figure 5:
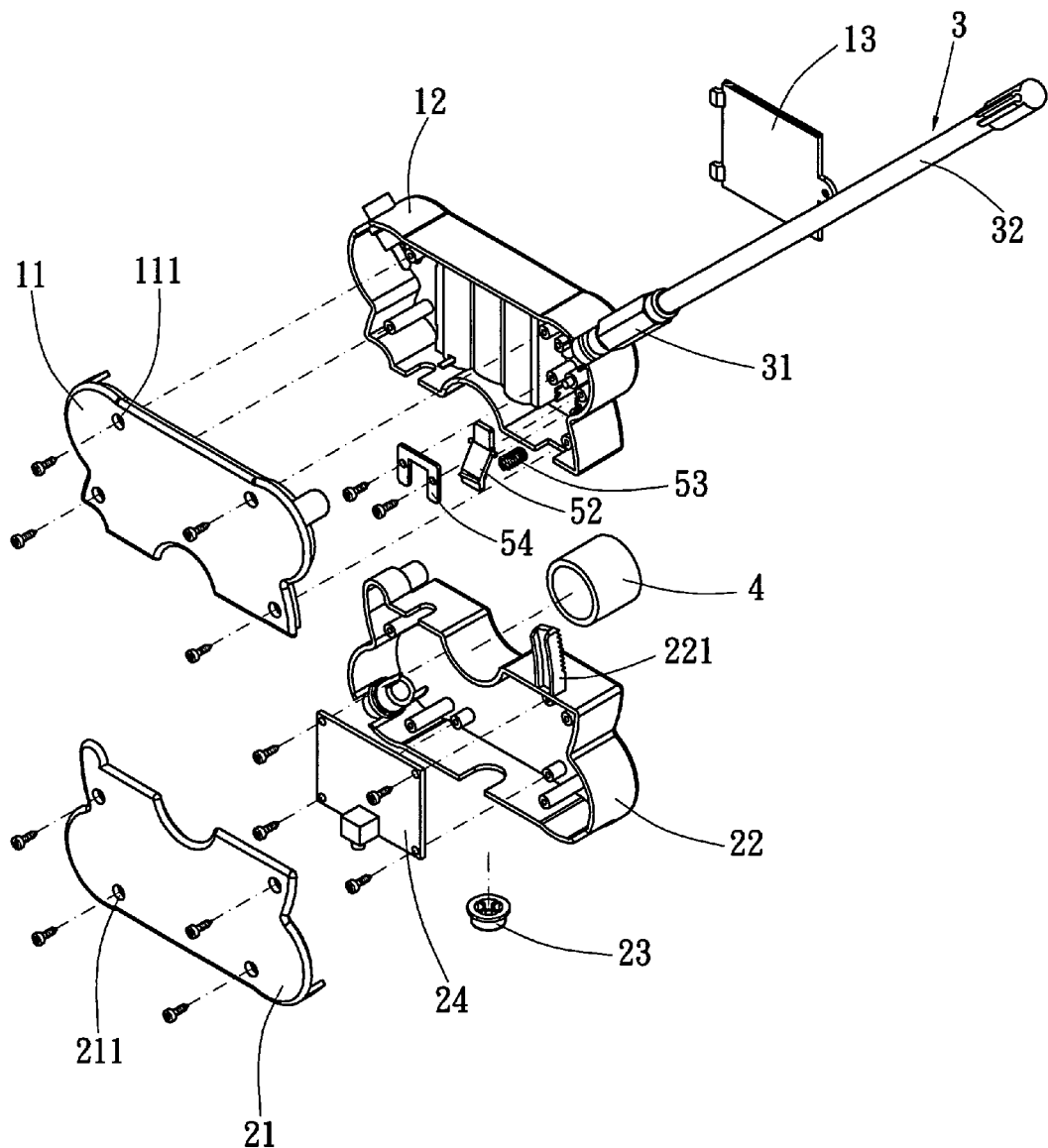
FIG. 5 is a perspective diagram of the disassembled parts of the present invention.

Further, refer to FIGS. 2, 3, and 5. In the figures, the ratchet bolt structure 5 disposed on the right end surface of the upper latch base 1 comprises a control post 51, a fixed ratchet plate 52, a spring 53, and a fixed plate 54, and installed into the opening at the lower right end surface of the latch base 1 in sequence, wherein the opening of the fixed plate 54 fixes the fixed ratchet plate 52, and installs a fixed base 521 for latching or separating the fixed ratchet plate 52. In FIG. 3-1, the ratchet 221 at the right end surface of the lower latch base 2 is latched into the upper latch base 1, and the control post 51 of the ratchet bolt structure 5 pulls its spring 53 upward and then pushes it towards the ratchet 221 to fix the ratchet plate 52 onto the teeth of the ratchet 221, so that the upper latch base 1 and the lower latch base 2 are secured onto the wheel axle 4. In FIG. 3-2, if it is necessary to separate the ratchet 22 on the right end surface of the lower latch base 2 from the upper latch base 1, its control post 51 of the ratchet bolt structure 5 is pressed downward, so that the fixed ratchet plate 51 is separated from the ratchet and presses against the spring 53. In other words, the fixed ratchet plate 52 is separated from the teeth of the ratchet 221, such that the upper latch base 1 and the lower latch base 2 can be separated from the wheel axle 4.

Please refer to FIGS. 1, 2, and 5. In the figures, a base 31 disposed at the bottom of the plastic optical fiber structure comprises a luminescence structure 311 and a plastic optical fiber 32 coupled to the top of the plastic optical fiber structure. The latch base 1' comprises a battery and a lid 13, a cable and a control circuit board 24, and a switch button 23. When the plastic optical fiber structure 3 is inserted into the insert hole 6 to connect the power supply for driving the plastic optical fiber to produce a luminescent effect, and also works together with the connection between the upper latch base 1 and the lower latch base 2 to install the luminescence wheel axle assembly on both sides of the axle of the wheel and accomplish the effects for the safety of night driving and the artistic appearance.

What is claimed is:

1. An improved luminescent wheel axle assembly, comprising:
    a latch base;
    a ratchet bolt structure; and
    a plastic optical fiber structure,
    wherein said latch base further comprises an upper latch base and a lower latch base, said latch base having a plurality of insert holes on a lateral end surface of said latch base for receiving said plastic optical fiber structure, said plastic optical fiber structure being coupled to a power supply to generate luminescence, said ratchet bolt structure being adjustable to allow said upper and lower latch bases to be secured to and removed from different axle diameters, thereby facilitating installation of said wheel axle assembly on opposing sides of an axle of a wheel to improve visibility of said wheel axle assembly at night.

2. An improved luminescent wheel axle assembly of claim 1, wherein said latch base includes a centrally located circular hole for engaging said axle of said wheel.

3. An improved luminescent wheel axle assembly of claim 1, wherein said upper latch base comprises a receiving rotary axle disposed at a lower left end surface of said upper latch base, a ratchet structure disposed at a right end surface of said upper latch base, and the insert holes disposed on a lateral end surface of an outer edge of said upper latch base.

4. An improved luminescent wheel axle assembly of claim 1, wherein said lower latch base comprises a rotary axle disposed at an upper left end surface of said lower latch base, a ratchet disposed at a right end surface of said lower latch base, and the insert holes disposed on a lateral end surface of an outer edge of said lower latch base.

5. An improved luminescent wheel axle assembly of claim 1, wherein said ratchet structure comprises a control post, a fixed ratchet plate, a spring, and a fixed plate.

6. An improved luminescent wheel axle assembly of claim 1, wherein said plastic optical fiber structure comprises a plastic optical fiber and a base, said plastic optical fiber structure having different colors.

7. An improved luminescent wheel axle assembly of claim 6, wherein said base of said plastic optical fiber structure comprises least one luminescence structure.

* * * * *